(No Model.)

N. H. GROSSELIN.
GIG MILL.

No. 557,991. Patented Apr. 7, 1896.

Witnesses
Jno. G. Hinkel
A. A. Dobson

Inventor
Nicolas H. Grosselin
By Josue Freeman
Attorneys

UNITED STATES PATENT OFFICE.

NICOLAS HENRY GROSSELIN, OF SEDAN, FRANCE, ASSIGNOR TO CHARLES HEAP, OF ROCHDALE, ENGLAND.

GIG-MILL.

SPECIFICATION forming part of Letters Patent No. 557,991, dated April 7, 1896.

Application filed February 2, 1893. Serial No. 460,702. (No model.) Patented in France May 30, 1890, No. 206,004; in Germany June 10, 1890, No. 65,078, and in England June 15, 1891, No. 19,929.

*To all whom it may concern:*

Be it known that I, NICOLAS HENRY GROSSELIN, a citizen of the French Republic, and a resident of Sedan, France, have invented certain new and useful Improvements in Gig-Mills, of which the following is a specification.

In that class of napping-machines or gig-mills in which a revolving drum carries two sets of napping-rolls, having teeth arranged so as to act with one set against and the other with the nap by the rotation in one direction of the drum, it is very desirable to provide means for varying the degree of the working energy of the machine—that is, to vary the relative speeds of the two sets of rolls, as upon this relation depends the working energy.

My invention (which was patented in France May 30, 1890, No. 206,004; in Germany June 10, 1890, No. 65,078, and in Great Britain June 15, 1891, No. 19,929) consists in means whereby to vary the relative speeds of the two sets of rolls and secure any desired degree of working energy, the said means consisting of a certain arrangement of driving gears and pinions and means for varying their movements, as fully set forth hereinafter, and as illustrated in the accompanying drawings, in which—

Figure 2:
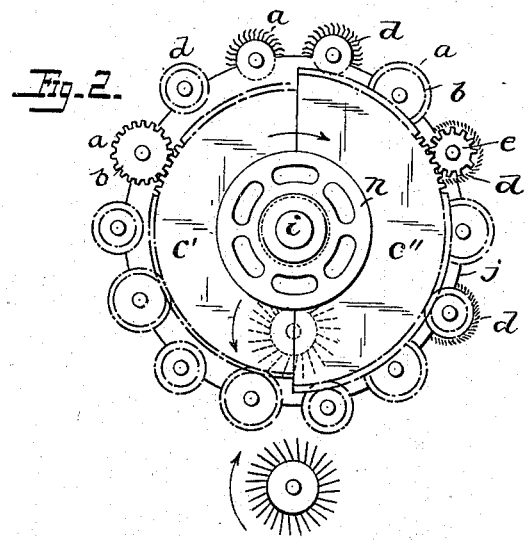
Figure 1:
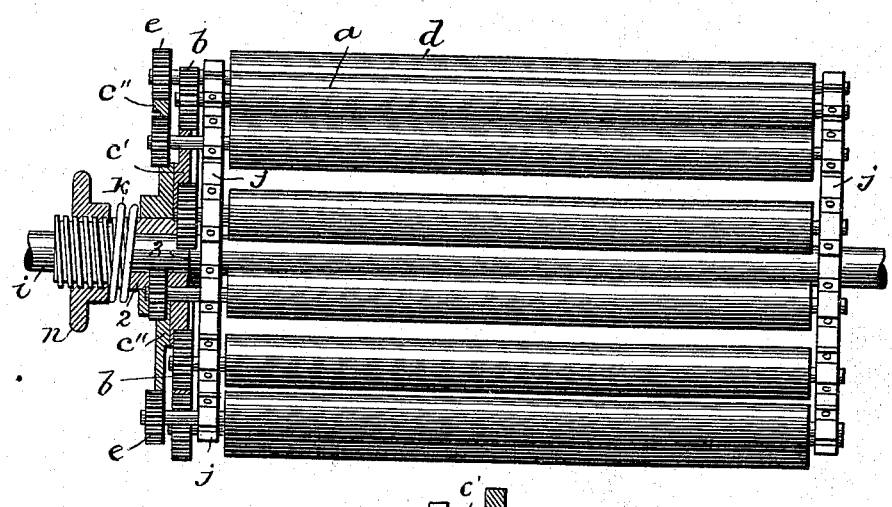
Figure 3:
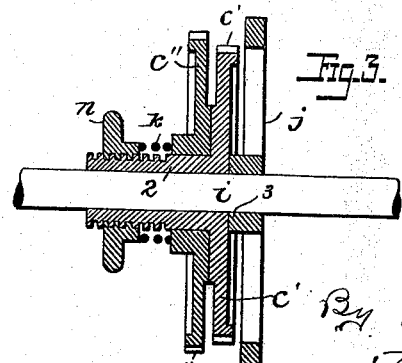

Figure 1 is a sectional elevation of sufficient of a gig-mill or napping-machine to illustrate my improvement. Fig. 2 is a divided end view of the drum and gears; Fig. 3, a sectional detached view.

It has not been considered necessary to illustrate the well-known parts of a napping-machine other than those immediately connected with the driving mechanism of the napping-rolls $a$ $d$, of which there are two series, the rolls $a$ alternating with the rolls $d$ and the shafts of all of the rolls extending beyond one of the heads $j$ of the drum, the shafts of the rolls $a$ carrying gears $b$, which may be either toothed or frictional gears, and which engage with the periphery of a gear-wheel or disk $c'$, turning upon the shaft $i$ of the drum and having an elongated hub 2, upon which turns a disk or gear-wheel $c''$, larger in diameter than the wheel $c'$ and gearing with pinions $e$ on the shafts of the napping-rolls $d$.

The two series of pinions $b$ $e$ are upon different vertical planes, as shown in Fig. 1, and the faces of the wheels $c'$ $c''$ may be brought in more or less frictional contact with each other by any suitable pressure device—as, for instance, by means of a nut $n$, screwing upon a threaded extension of the hub 2, and an interposed spring $k$, between the nut and the disk or wheel $c''$.

The inner face of the wheel $c'$ bears against the outer face of the hub 3 of the drum-head or disk $j$, and by increasing the pressure by screwing in the nut $n$ both wheels may be clamped together to turn with each other, and by drawing out the nut the pressure may be taken off, so that the wheels can practically turn independently of the shaft and of each other.

The rollers $a$ acting with the nap may have pinions of, say, twenty-seven or even thirty teeth, and the diameter of the disk $c''$ may be such that it will engage with gears $e$ upon the shafts of the rollers $d$ of eighteen or even sixteen teeth, the said rollers acting against the nap.

If the two wheels or disks are strongly forced together and held stationary, they will practically form one plate, producing a positive movement of each set of napping-rolls in the same direction, but at different speeds.

One or the other of the disks may be positively driven from a belt or otherwise, as is common in this class of machines, or, as shown, the rolls $a$ of the first set, having the card-teeth turned forward in the direction of the drum's rotation, will engage with the fabric and be rotated as they travel over the fabric, and will thereby impart movement to the gears $b$ and disk $c'$, and the latter, by its frictional contact with the disk $c''$, will move the latter, driving the other set of rolls.

If the pinions of the rollers acting with the nap have, say, thirty teeth, while those of the rollers acting against the nap have but sixteen teeth, (taking at outside limits,) the result in driving the latter rolls from the former will be a difference of speed between the two sets of sixteen-thirtieths, or nearly fifty per cent., which will correspond to twenty-five per cent. of the useful effect of each of the two sets of rollers. Experience shows that this degree of energy seldom exceeds that which is necessary for the teazeling of the hardest cloths. It may therefore be considered as a maximum energy seldom required. This energy may be modified by fitting smaller pinions on the rollers acting with the nap and larger on those acting against the nap, so as to diminish the energy of the machine to adapt it to all the different kinds of cloth to be dealt with. This effect may be secured by slackening the frictional contact of the two wheels or disks $c'$ $c''$, so as to permit more or less slip of one upon the other. If the pressure is entirely released, the two disks will be entirely independent and loose, and the pinions and the rollers acting with the nap will cease to act to drive the pinions of the other rollers, and the two sets of rollers will be practically free, with a minimum useful effect.

Between the minimum energy from having the disks loose and independent and the maximum energy from clamping them forcibly together, different degrees of variation of energy can be obtained by increasing or reducing the frictional contact and pressure of the two disks or wheels, so as to secure greater or less slip.

It will be evident that various kinds of friction-pressure devices may be employed for varying the pressure of one disk upon the other, and different arrangements may be employed whereby the disk gearing with one set of rolls may be frictionally driven from the other.

Without limiting myself to the precise construction and arrangement of parts shown, I claim—

1. The combination with a drum carrying two series of napping-rolls having the teeth set in opposite directions, of two driving wheels or disks each gearing with gears upon one set of the rolls, and a friction-clutch for driving one disk by the other, substantially as set forth.

2. The combination of the drum, two series of rollers each carrying a set of gears, and wheels or disks $c'$, $c''$, each engaging one series of gears, one wheel bearing upon the other, and an adjustable pressure device arranged to press the wheels frictionally together, substantially as and for the purpose set forth.

3. The combination of a drum, two sets of napping-rolls having teeth set in opposite directions and with gears of different diameters, and two driving-wheels each engaging one set of gears and frictional connections between the wheels, substantially as described.

In testimony whereof I have signed my name to this specification in the presence of two subscribing witnesses.

NICOLAS HENRY GROSSELIN.

Witnesses:
L. LAMSTEDS,
C. GERARD.